Nov. 30, 1943.   R. L. SMITH   2,335,704
ALKYLATION OF ISOPARAFFINS
Filed Jan. 6, 1941
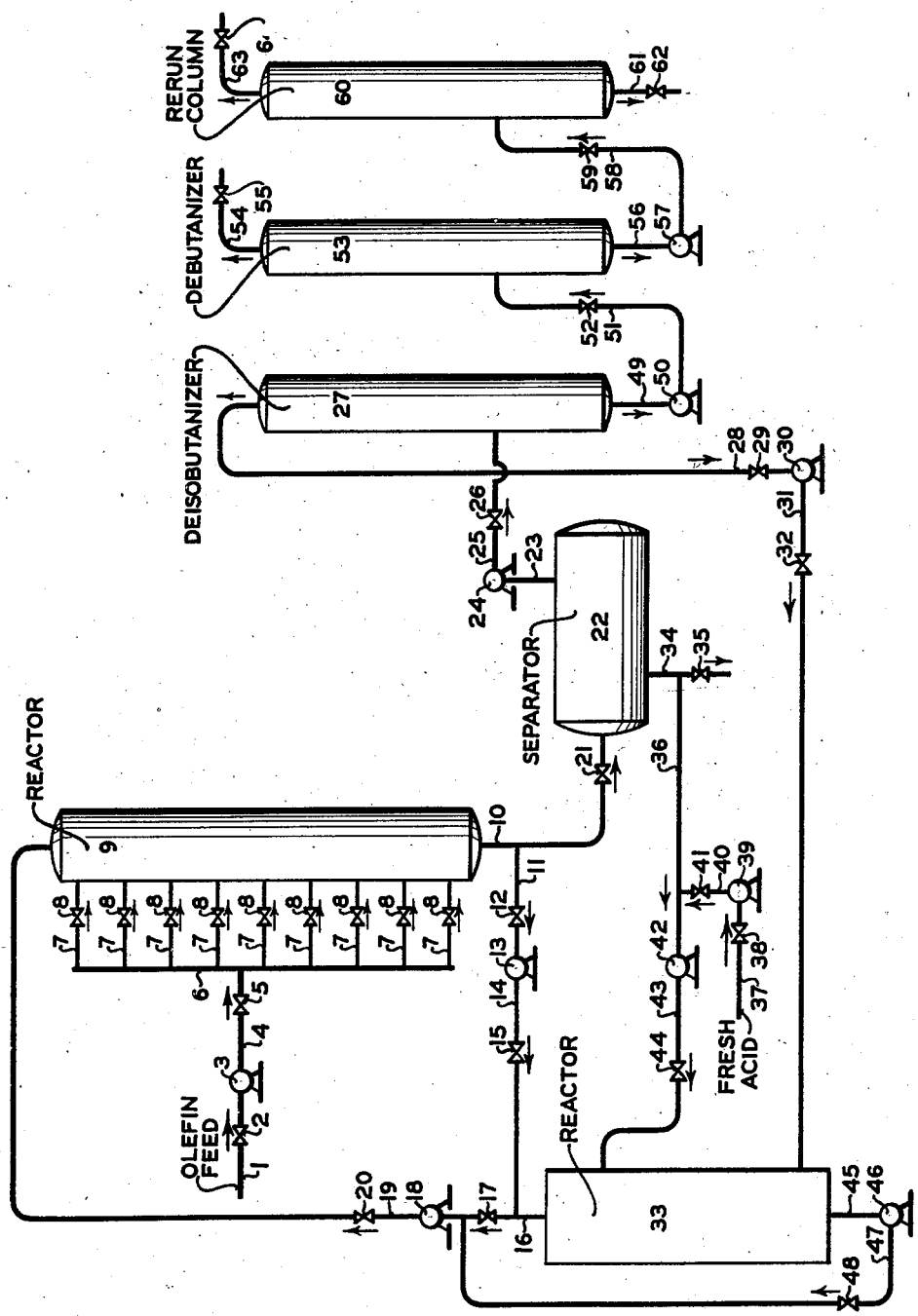
INVENTOR
ROBERT L. SMITH
BY
ATTORNEY Patented Nov. 30, 1943

2,335,704

UNITED STATES PATENT OFFICE 2,335,704

ALKYLATION OF ISOPARAFFINS

Robert L. Smith, Chicago, Ill., assignor to Universal Oil Products Company, Chicago, Ill., a corporation of Delaware Application January 6, 1941, Serial No. 373,289

9 Claims. (Cl. 260—683.4)

This invention relates to the treatment of branch chain paraffin hydrocarbons with olefins using concentrated sulfuric acid or anhydrous hydrofluoric acid as the catalyst.

In a more specific sense, the invention is concerned with improvements in the process for preparing saturated motor fuels by alkylating isoparaffins with olefins in the presence of a strong acid, particularly concentrated sulfuric acid.

One process in use at the present time for the conversion of light gaseous hydrocarbons into motor fuel consists in the interaction of isoparaffins with olefins in the presence of strong acids such as sulfuric acid or anhydrous hydrogen fluoride. Under appropriate conditions the reaction

Isoparaffin+olefin=isoparaffin' takes place with a minimum production of olefin polymers and heavy products. For example, isobutane will react with propylene or butylene to form a saturated motor fuel when these reactants are contacted in the presence of relatively concentrated sulfuric acid and in the presence of high ratios of isoparaffin to olefin. Higher molecular weight isoparaffins, such as isopentane, will also undergo alkylation reaction with olefins.

A method for operating the alkylation process well known to the art may be briefly described as follows:

Isoparaffins are allowed to react with olefins in the presence of sulfuric acid under the desired conditions of temperature until the olefins have been substantially removed. Isobutane is the isoparaffin commonly used, although higher molecular weight isoparaffins will also react under the same conditions. The higher molecular weight isoparaffins are themselves valuable constituents of a motor fuel and consequently are less commonly used as a charging stock for the process than is isobutane. Olefins from $C_2$ to $C_8$, inclusive, are used, although the common charging stocks are often limited to $C_3$ and $C_4$ olefins. The acid in contact with the hydrocarbons may be at a concentration somewhere between 88 and 93% titratable acidity. Acid concentrations outside of this range may be used, although it is a matter of economy not to discard acids of greater strength than those mentioned. As the acid concentration falls below that mentioned, there is an increasing amount of polymerization reactions and the quality of product must be compared with the amount of acid catalyst used. The charging stock is commingled with an isoparaffin recycle such that the isoparaffin:olefin ratio in the hydrocarbon feed to the alkylation zone is approximately 5:1. The ratio in some cases may be as small as 3:1 and perhaps as high as 10:1. It is somewhat dependent upon the olefins being used.

The process is usually operated on a continuous basis, complex mixtures of unreacted isoparaffins, normal paraffins, motor fuel, and heavier products being withdrawn from the reactor at the same rate as fresh charging stock and acid are being supplied to the reactor. In order to keep the competing olefin polymerization reaction at a minimum, the ratio of isoparaffins to olefins in the reacting zone is kept high. At the point of introduction of the olefin, it is common to have present 100 moles of isoparaffin for each mole of olefin being supplied in the charging stock. This ratio is subject to some variation and is considerably affected by the method of the introduction of feed and the efficiency of mixing. As the process is usually operated, sufficient pressure is used to keep all the constituents in liquid phase. Pressures higher than this are of no particular aid to the process. The pressure necessary to prevent vaporization in the system depends both on the composition of the feed and on the temperature used. Temperatures between 32 and 50° F. are quite satisfactory, although satisfactory results have been obtained with temperatures as low as 15° F. and as high as 100° F. The ratio of acid to hydrocarbon is usually 1:1 on a volume basis, but may be varied readily from 0.7:1 to 2:1. The reactor used in the process consists quite often of a tower equipped with orifice plates, although any method that satisfactorily contacts two immiscible liquids may be used.

The present invention comprises a number of modifications and improvements of the above described process of alkylating isoparaffins with olefins in the presence of relatively concentrated mineral acid. One feature of this invention is the interaction of the used acid to be recycled to the process with isoparaffins in a separate reaction zone. It is well known that the acid layer in alkylation processes contains dissolved in it complex hydrocarbons and their reaction products with acid which substances tend to destroy the acid and decrease its period of usefulness. One of the advantages of the separate interaction of isoparaffins with used acid is to increase the life of the acid and to convert the hydrocarbon substances present in it to useful products. Another advantage of this interaction of the used acid with isoparaffins is to saturate the acid phase with the isoparaffins before contacting it with olefins in order to reduce the reactions of polymerization. Another feature of my invention is the injection of the olefin-containing feed at a plurality of points in the alkylation reactor.

In one specific embodiment my invention comprises a process for the preparation of motor fuels by alkylation of isoparaffins with olefins which comprises subjecting a mixture of used sulfuric acid obtained in a manner hereinafter set forth to the action of isoparaffins to interact said isoparaffins with the hydrocarbon constituents of said acid, injecting an olefin-containing charge into a mixture of said sulfuric acid and isoparaffins at a plurality of points in a reaction zone while maintaining controlled and correlated conditions of temperature, amount and concentration of acid, time of contact and proportion of isoparaffins and olefins to effect the alkylation of said isoparaffins and olefins to form a saturated motor fuel, separating the mixture of sulfuric acid and hydrocarbons, withdrawing the hydrocarbon product to a separating zone for separation of excess reactant isoparaffins and a motor fuel and interacting said excess isoparaffins with the separated sulfuric acid as hereinbefore set forth.

The accompanying drawing diagrammatically illustrates conventional apparatus arranged for carrying out the process of my invention.

Referring now to the drawing, an olefin-containing feed is supplied to the process through line 1 and after passing through valve 2 enters pump 3 which discharges into line 4 controlled by valve 5. This olefin-containing feed usually and preferably contains isoparaffins. A ratio of 5 mols of isoparaffin to one of olefins represents a satisfactory proportion. The olefin-containing feed enters a reactor at a plurality of points indicated diagrammatically by the manifold 6 to which it is connected by a plurality of lines each controlled by a separate valve. This plurality of lines is indicated by lines 7, etc., controlled by valves 8. This representation is quite diagrammatic and is intended to represent the principles involved rather than to illustrate some particular form of equipment. This reactor 9 is supplied by a mixture containing sulfuric acid and an isoparaffin, which in the particular flow shown in the drawing, is introduced at the top. The proportion of isoparaffins to olefins is so adjusted that the maximum concentration at the point where the olefin is introduced into the reactor is usually less than one mole of olefin per 100 moles of isoparaffin at that point. The removal of olefin is quite rapid. The amount present in the reaction mixture by the time it has reached the second point of injection in the series is so small that it is difficult to measure. The reaction zone itself may be thought of as a number of sub-zones in which the olefin to isoparaffin ratio varies from a quantity approaching zero to that somewhat less than one to a hundred. As the reaction of alkylation is exothermic, it is desirable to provide internal cooling in the reactor. This may be done readily by a closed-coil arrangement. It is also desirable to provide for thorough mixing of the two phases. A packed tower will accomplish this purpose, although a tower equipped with orifice plates will usually be found to be more effective. The temperature in reactor 9 may vary within the approximate limits of 15–100° F. The preferred range is from about 32 to about 50° F. Sufficient pressure is used on the system to keep the constituents in the liquid phase. The average residence time of the reactants is of the order of 10–120 minutes with 60–70 minutes being a representative value.

The mixture of hydrocarbons and acid is discharged from reactor 9 into line 10 from which a portion may be directed to line 11 controlled by valve 12 and supplied to pump 13, discharging into line 14 controlled by valve 15. This recycle mixture of acid and hydrocarbons is then discharged into line 16 controlled by valve 17. In line 16 this recycle mixture of acid and hydrocarbons is commingled with a further quantity of acid and isoparaffins obtained in a manner hereinafter set forth. This combined mixture of acid and hydrocarbons is then supplied to pump 18 which discharges into line 19 controlled by valve 20 from which it is charged to reactor 9 for treatment as hereinbefore set forth. That portion of the acid and hydrocarbons not recycled is directed through valve 21 into separator 22 wherein the acid layer is separated from the hydrocarbons.

The hydrocarbon layer is removed from separator 22 by way of line 23 and is supplied to pump 24 which discharges into line 25 controlled by valve 26. The hydrocarbons are discharged from line 25 into de-isobutanizing column 27 wherein the excess reactant isoparaffins which in the majority of cases will be isobutane is separated from the alkylate. This excess of reactant isoparaffins is removed as an overhead product from column 27 by way of line 28 controlled by valve 29. Column 27 operates in the normal manner but for the sake of simplicity in the drawing, the condenser and receiver have been omitted. After passing through valve 29, the isoparaffins in line 28 are supplied to pump 30 which discharges into line 31 controlled by valve 32 which in turn discharges into reactor 33.

The acid layer obtained from separator 22 is removed by way of line 34 and a portion of the said acid discharged through valve 35 as waste acid. This waste acid which may be of a concentration varying between 88 and 93% titratable acidity may be utilized in the refinery for such purposes as treating raw oil stocks or may be regenerated and re-used in the alkylation process. The greater portion of the acid in line 34 is directed to line 36 wherein it is commingled with a quantity of fresh acid equivalent to the spent acid withdrawn from the system, the fresh acid being introduced to the system by way of line 37 controlled by valve 38 from which it enters pump 39 discharging into line 40 controlled by valve 41. The mixture of used and fresh acid in line 36 is supplied to pump 42 discharging into line 43 controlled by valve 44 from which it is supplied to reactor 33 as shown in the drawing.

In reactor 33 the sulfuric acid and isoparaffins are subjected to contact using countercurrent flow, the heavier acid settling to the bottom of the reactor while the lighter hydrocarbons rise to the top. These reactant isoparaffins, usually isobutane, will react with the complex hydrocarbon constituents present in the acid layer forming a saturated alkylate at the same time regenerating the used acid. A certain amount of the isoparaffin is dissolved in the used acid layer and a part is emulsified with it. The mixture of sulfuric acid with dissolved and emulsified isoparaffins is removed from reactor 33 by way of line 45 which supplies pump 46, discharging into line 47 controlled by valve 48. The isoparaffinic layer is removed from the top of reactor 33 by way of line 16, after which it is commingled with the acid layer obtained from line 47 and with the recycle stream obtained from line 14 as shown in the figure. This mixture of acid and hydrocarbons is then directed to reactor 9 as hereinbefore set forth. The alkymer separated as a higher boiling product from fractionating column 27 is removed by way of line 49 and is supplied into pump 50 discharging into line 51 controlled by valve 52. In the usual case where isobutane is the isoparaffin used, the alkymer will contain dissolved in it the normal butane which was present in the olefin-containing feed. In such cases a debutanizing column is used to separate the normal butane from the alkylate. This separation is accomplished in debutanizer 53, the normal butane being removed from the system as an overhead product by way of line 54 controlled by valve 55. The debutanized alkymer is removed from column 53 by way of line 56 and supplied to pump 57 which discharges into line 58 controlled by valve 59. This alkymer is then directed to re-run column 60 wherein the small proportion of material boiling above the motor fuel boiling range is separated as a bottoms product and removed from the system by way of line 61 controlled by valve 62. The portion boiling in the motor fuel range is removed as an overhead product by way of line 63 controlled by valve 64. In order to simplify the drawing, condensers and receivers have been omitted from both columns 53 and 60.

The following example is introduced to indicate the character of the results obtainable by the use of the present process, although it is not intended to limit the scope of the process in the exact correspondence with the data submitted.

A residual gas formed by the removal of the isobutene in the butane-butene fraction of sulfuric acid polymerization may be used as feed for the process. A typical charging stock of this nature may have the following composition: 18.4% normal butenes, 25.6% isobutane, 54.7% normal butane, and 1.3% pentanes.

The mixture of acid and isobutane supplied to the reactor 33 may contain approximately 1 volume of acid for 1 or 2 volumes of hydrocarbons. The charging stock is introduced to the reactor at a plurality of points and at such a rate that the olefin to isoparaffin ratio is somewhat less than 1 to 100 at the maximum. The minimum ratio of olefin to isoparaffin in the column will be so small that it will be difficult to measure accurately by the routine methods. After separating the acid and hydrocarbons the greater portion of the acid will be recycled to the process. A small quantity of acid of the order of 0.5 lb. of acid per gallon of alkymer will be discarded from the system. The hydrocarbon layer obtained in the separator is de-isobutanized and the isobutane used to extract the used acid. After removal of the isobutane, the normal butane is then removed in a second fractionating column and the debutanized product sent to a re-run column for separation into motor fuel and heavy bottoms.

The amount of heavy bottoms may be approximately 6% of the total weight of the alkylate. The alkylate sent to storage may contain approximately 86% $C_8$ hydrocarbons. The Br number will be less than 0.1. The octane number will be approximately 93 by the C. F. R. motor method.

I claim as my invention:

1. A process for the preparation of motor fuels by alkylation of isoparaffins with olefins which comprises continuously flowing a mixture of an isoparaffin and sulfuric acid obtained in a manner hereinafter set forth through a reaction zone, simultaneously injecting olefin and isoparaffin into said mixture at a plurality of points in the said reaction zone while maintaining controlled and correlated conditions of temperature, amount and concentration of acid, time of contact and proportion of isoparaffin and olefin to effect the desired formation of saturated hydrocarbons of the motor fuel boiling range as the principal reaction in the process, separating the mixture of sulfuric acid and hydrocarbons, separating the hydrocarbon product into a motor fuel and excess reactant isoparaffin, subjecting said separated sulfuric acid together with additional fresh acid to contact with the reactant isoparaffin in the absence of said olefin-containing charge to react said isoparaffin with the hydrocarbon constituents dissolved in said sulfuric acid and supplying said partly regenerated acid and fresh acid with isoparaffin to said reaction zone for reacting with an olefin-containing feed as hereinbefore set forth.

2. A process for the preparation of motor fuels by alkylation of isoparaffins with olefins which comprises continuously flowing a mixture of an isoparaffin and sulfuric acid obtained in a manner hereinafter set forth through a reaction zone, simultaneously injecting olefin and isoparaffin into said mixture at a plurality of points in the aforesaid reaction zone while maintaining controlled and correlated conditions of temperature, amount and concentration of acid, time of contact and proportion of isoparaffin and olefin to effect the desired formation of saturated hydrocarbons of the motor fuel boiling range as the principal reaction in the process, separating the mixture of sulfuric acid and hydrocarbons, separating the hydrocarbon product into a motor fuel and excess reactant isoparaffin, subjecting said separated sulfuric acid together with additional fresh acid to contact with said excess reactant isoparaffin in countercurrent flow and in the absence of said olefin-containing charge to react said isoparaffin with the hydrocarbon constituents present in said used acid, commingling said partly regenerated acid and fresh acid with the reactant isoparaffin and supplying the resulting mixture to said reaction zone for reacting with an olefin-containing charge as hereinbefore set forth.

3. A process for the preparation of motor fuels by alkylation of isobutane with olefins which comprises continuously flowing a mixture of isobutane and sulfuric acid obtained in a manner hereinafter set forth through a reaction zone, simultaneously injecting olefin and isoparaffin into said mixture at a plurality of points in the aforesaid reaction zone while maintaining controlled and correlated conditions of temperature, amount and concentration of acid, time of contact and proportion of isobutane and olefin to effect the desired formation of saturated hydrocarbons of the motor fuel boiling range as the principal reaction in the process, separating the mixture of sulfuric acid and hydrocarbons, withdrawing the hydrocarbon product to a separating zone to effect separation of a motor fuel and excess isobutane, subjecting said sulfuric acid together with additional fresh acid to contact with isobutane in the absence of said olefin-containing charge to react said isobutane with the hydrocarbon constituents dissolved in said used sulfuric acid and supplying said partly regenerated sulfuric acid and fresh acid in admixture with isobutane to said reaction zone for reacting with an olefin-containing feed as hereinbefore set forth.

4. In the alkylation of isoparaffins with olefins wherein the feed comprising olefin and isoparaffin is introduced to a reaction zone containing isoparaffin and acid alkylating catalyst, a reaction mixture of hydrocarbons and catalyst removed from the reaction zone and the mixture separated into a hydrocarbon layer and an acid layer containing hydrocarbon constituents, the method which comprises separating unreacted isoparaffin from said hydrocarbon layer, combining fresh acid catalyst with at least a portion of said acid layer and contacting the resulting mixture with said unreacted isoparaffin in a second zone in the absence of added olefins to react isoparaffin with hydrocarbon constituents of the acid layer and supplying acid catalyst and isoparaffin from said second zone to the first mentioned reaction zone.

5. The method as defined in claim 4 further characterized in that said catalyst comprises sulfuric acid.

6. The method as defined in claim 4 further characterized in that said catalyst comprises hydrogen fluoride.

7. In a process for the preparation of motor fuel which comprises continuously flowing a mixture of an isoparaffin and acid alkylating catalyst through a reaction zone, simultaneously injecting an olefin-containing charge into the mixture to alkylate the isoparaffin, and separating used acid from the reaction product and reusing it in the process, the step which comprises mixing said used acid with additional fresh acid and reacting the mixture with an isoparaffin prior to re-use thereof and prior to its contact with said olefin-containing charge.

8. In a process for the preparation of motor fuel which comprises continuously flowing a mixture of an isoparaffin and acid alkylating catalyst through a reaction zone, simultaneously injecting an olefin-containing charge into the mixture to alkylate the isoparaffin, and separating used acid from the reaction product and re-using it in the process, the step which comprises mixing said used acid with additional fresh acid and reacting the mixture with an isoparaffin prior to re-use thereof and prior to its contact with said olefin-containing charge to increase the life of the acid and to convert hydrocarbon substances therein into useful products.

9. In a process for the preparation of motor fuel which comprises continuously flowing a mixture of an isoparaffin and acid alkylating catalyst through a reaction zone, simultaneously injecting an olefin-containing charge into the mixture to alkylate the isoparaffin, and separating used acid from the reaction product and re-using it in the process, the step which comprises mixing said used acid with additional fresh acid and reacting the mixture with an isoparaffin prior to re-use thereof and prior to its contact with said olefin-containing charge to saturate the acid with isoparaffin to minimize polymerization reactions in said process.

ROBERT L. SMITH.